| CYCLE | SIGNAL | FUNCTION |
|---|---|---|
| 1 ST | $\overline{ACSD}$ | ADD ONE COUNT OR SET ADA FLIPFLOPS FOR COMPLEMENTING |
| | $\overline{AADD}$ | ADD OR COMPLEMENT DIFFERENCE REGISTER TO BUFFER |
| | $\overline{AARD}$ | RESET ADD (ADA) FLIPFLOPS WHEN ADDING |
| | $\overline{ARRD}$ | RESET DIFFERENCE REGISTER |
| 2 ND | $\overline{ACSO}$ | SET ACON FLIPFLOPS FOR COMPLEMENTING |
| | $\overline{AADO}$ | COMPLEMENT OLD NUMBER REGISTER TO DIFFERENCE REGISTER |
| | $\overline{AARO}$ | (NOT USED) |
| | $\overline{ARRO}$ | RESET OLD NUMBER REGISTER |
| 3 RD | $\overline{ACSN}$ | SET NEW NUMBER IN NEW NUMBER REGISTER |
| | $\overline{AADN}$ | ADD NEW NUMBER TO DIFFERENCE REGISTER AND TO OLD NUMBER REGISTER |
| | $\overline{AARN}$ | RESET ADD (AADNN) FLIPFLOP |
| | $\overline{ARRN}$ | RESET NEW NUMBER REGISTER |

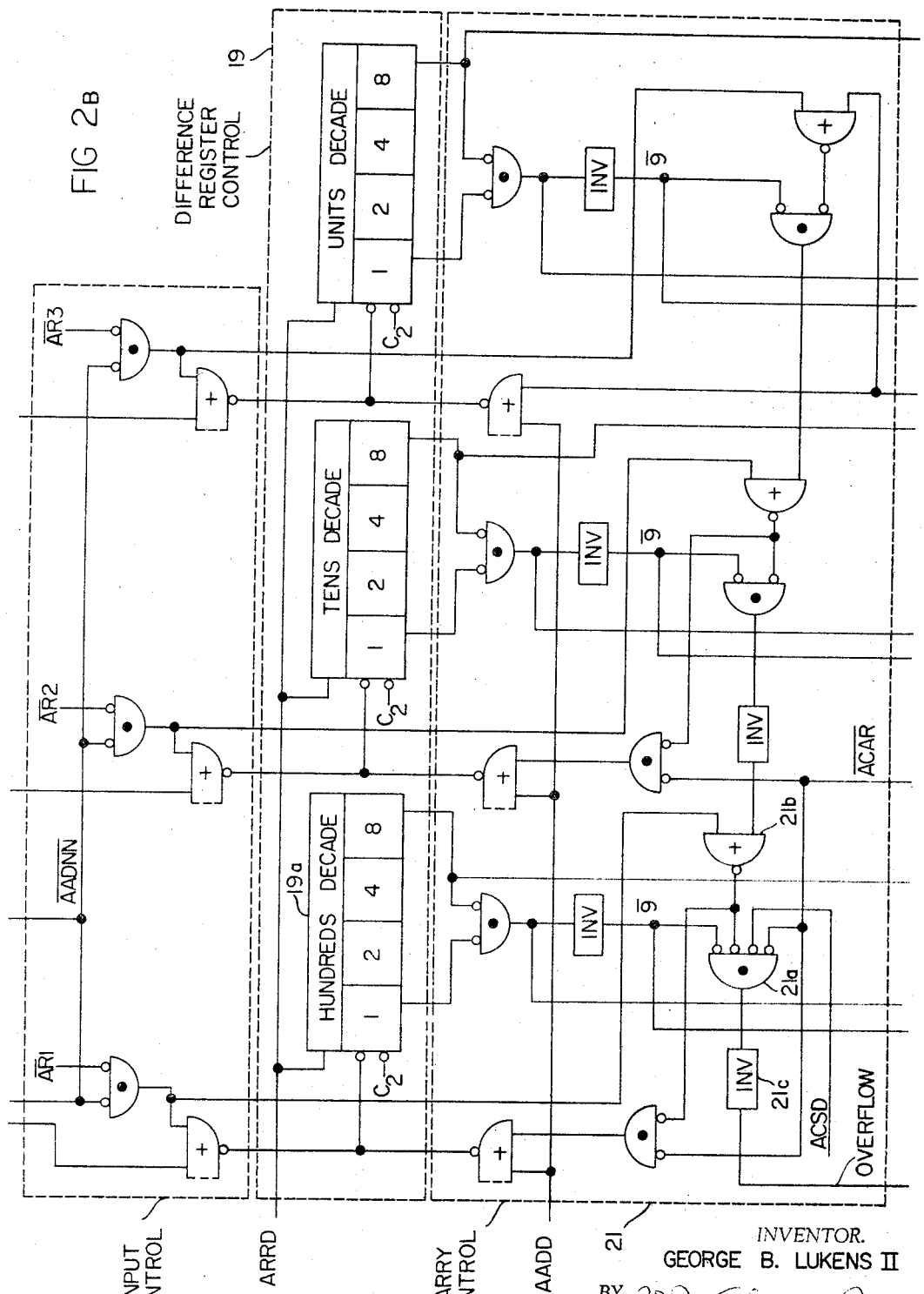

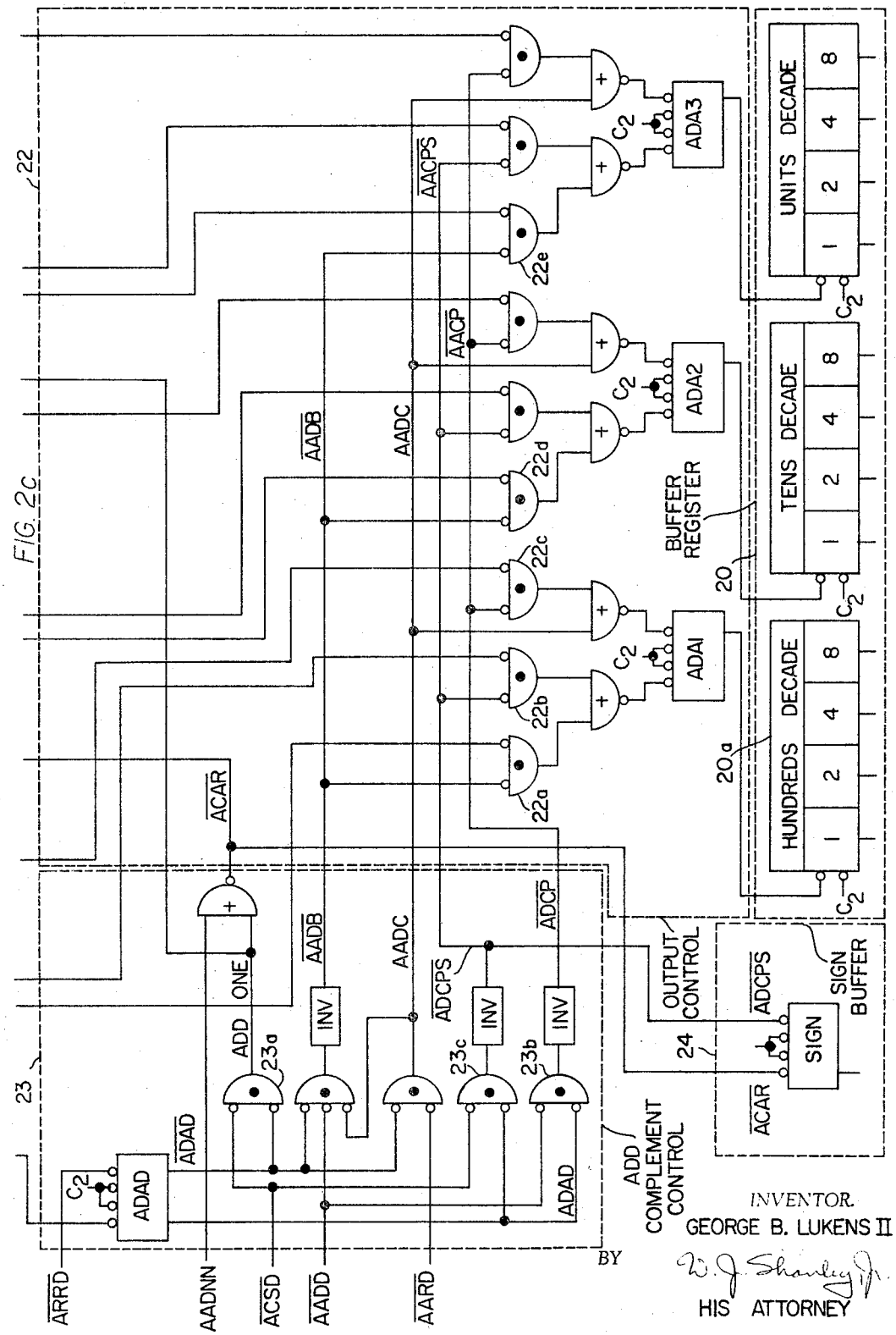

FIG. 5

United States Patent Office 3,424,898
Patented Jan. 28, 1969

3,424,898
BINARY SUBTRACTER FOR NUMERICAL CONTROL
George B. Lukens II, Waynesboro, Va., assignor to General Electric Company, a corporation of New York
Filed Nov. 8, 1965, Ser. No. 506,712
U.S. Cl. 235—174                 12 Claims
Int. Cl. G06f 7/385, 7/50

ABSTRACT OF THE DISCLOSURE

An arrangement for subtracting two numbers employing registers operating in a binary coded decimal radix system with nine's complementing.

---

This invention relates to digital logic circuits for parallel subtraction of two numbers, and more particularly to digital subtracters of the type which provide a difference number having a sign to indicate which of the two numbers is larger.

One very well-known type of numerical contouring control is designed to be programmed by so-called "departure coordinates." When utilizing such programming, the difference between actual and desired tool position provides sufficient information for the control to direct the motions in the proper straight line path to the desired position at which position motion is terminated. However, there are applications in which it is highly desirable to use "absolute coordinates" programming. This means that each new dimension would be given from a fixed zero dimension. However, since this type of contouring control is inherently designed to work in conjunction with a departure coordinate system, it was found to be necessary to provide means for converting the absolute coordinate programming information into departure coordinate information which could be utilized to program a standard contouring control. To perform such conversion, a converter must be provided for successively subtracting one absolute coordinate from its successor to generator the departure commands which can be applied to the input buffers of the control. In addition, a sign must be associated with each departure command to indicate which number is larger and thus provide direction commands.

It is thus an object of this invention to provide a new and improved binary subtracter for providing a difference number having a sign to indicate which number is larger.

It is a further object of this invention to provide a new and improved binary subtracter for converting absolute coordinate programming to departure coordinate information having a sign to indicate direction.

It is well-known in the prior art that the difference between two numbers may be obtained digitally by adding the nine's complement of one number to the other number. Consequently, binary subtraction is recognized as being but one form of binary addition, these operations fundamentally differing only in the respect that one number appears as a complement in a subtraction operation. Both serial and parallel binary subtracters of many different types are provided by the prior art. It is, however, usually desirable from the speed of operation aspect to perform such operations in parallel. However, characteristically the high speed attainable by parallel operation is usually obtained only at the expense of increased complexity which is attributable not only to the expense associated with providing parallel signal paths, but also to the elaborate logic circuitry necessary to control prior art type of binary subtracters.

It is, therefore, an object to provide a new and improved parallel binary subtracter of great simplicity.

A recent improved prior art adder which is particularly well suited for parallel operation and is extremely simple utilizes the number stored in an addend register for controlling the addition-type counting of the augend register so as to insert therein a number of pulses equal to the content of the addend register. In accordance with my invention, I make use of this improved type of adder for the purpose of obtaining the difference between two consecutive absolute coordinate numbers to generate departure information having a sign indicative of desired direction of motion.

In order to use this type of adder in a binary subtracter, the number which is to be subtracted from the other number is temporarily stored in a first register so that it may be utilized to control the counting of a second register so as to insert therein a number of pulses equal to the complement of the contents of the first register. Assuming now that the second register, hereinafter called the difference register, contained the other number, the difference between these numbers will thus be stored in the difference register. If, however, the difference register was cleared at the time of the addition of the complemented number, the difference number can thereafter be obtained by additively counting into the difference register a number of pulses equal to the other number. Thus, it will be readily recognized that the order in which the information is transferred into the difference register is unimportant as far as the basic operation is concerned.

However, in accordance with the preferred embodiment of my invention, the first number received, hereinafter referred to as the old number, is stored during the previous subtraction operation in what will be hereinafter referred to as the old number register. Upon completion of that operation, a number of pulses equal to the complement of the old number in counted into the difference register under control of the old number register. Then the next number received, hereinafter referred to as the new number, is added to the contents of the difference register under control of the new number register. Simultaneously with this operation, the new number is also read into the old number register which has been cleared after the complement of the old number was read into the difference register. Thus the present new number is stored for the next cycle operation at which time it will be utilized as the old number.

It is an important feature of this invention that the buffer register which serves as the inputs to the numerical control always contains the difference number along with a sign to indicate whether the new number was larger or smaller than the old number. This is necessary to provide direction control as well as excluding the transfer of the complement of the difference number to the buffers. Departure information must be applied in this form to the buffers in spite of the fact that the relationship between the magnitudes of the new and old numbers can vary back and forth as the programming proceeds. This results in the difference register having the difference number appear in two possible forms. If the new number is larger, the direction sign is plus and the difference register contains the difference between the old and new numbers minus one. If, however, the new number is smaller than the old, the direction sign will be minus and the difference register will then contain the nine's complement of the difference.

These conditions are then sensed by detecting an overflow from the highest order of the difference register in accordance with the results thereof. The contents of the difference register is either added into the buffer registers or its complement is added thereto. It may be demonstrated that if the new number is larger, an overflow pulse will be generated by the most significant decade of the difference register in response to the addition of the new number to the register. If this condition is detected, a count of one is added to the least significant order of the difference register to provide the correct difference number. The contents of the difference register are then utilized to control the counting of the buffer register so as to insert numbers equal to the counts stored in the corresponding decades of the difference register.

If, however, the new number is smaller than the old number, no carry will take place and the difference register will contain the nine's complement of the difference. This condition is detected and is utilized to initiate a complementary transfer of the information in the difference register to the buffer register. It thus may be seen that in accordance with the invention the buffer register always contains the difference between the old and the new number as well as a sign indicating the direction no matter what the order and magnitudes of the old and the new numbers.

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings.

In the drawings:

FIG. 1 is a block diagram of a binary subtracter in accordance with the principles of the invention;

FIGS. 2A, 2B, and 2C are schematic diagrams showing the details of the system of FIG. 1 exclusive of the Cycle Control circuit;

FIG. 5 is a chart explaining the functions of the control signals generated by the Cycle Control circuit of FIG. 3;

In FIGS. 2-4, FIG. 6, and FIG. 7, logic circuits and timing diagrams are presented for a preferred embodiment of a digital subtracter in accordance with the principles of the invention. These diagrams include NOR logic components of types which are well-known in the art. The nature and modes of operation of these logic circuit components are old and well-known, and thus it is not felt to be necessary to go into a detailed explanation of their operation other than what is associated with the discussions of the timing diagrams.

Figure 1:
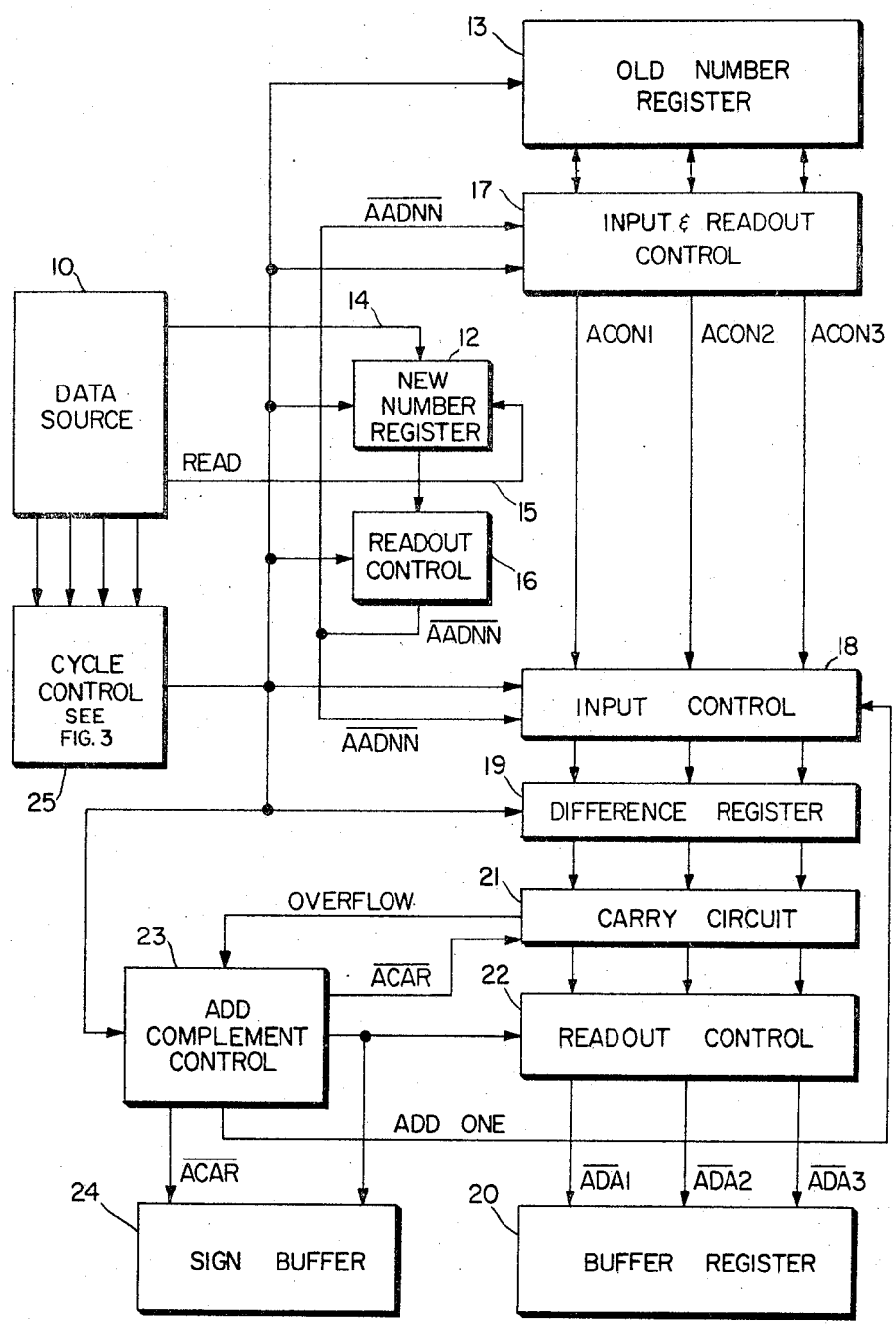

FIG. 1 shows a subtracter circuit in accordance with the principles of the invention. This circuit is comprised of four registers and their associated control circuits as well as a Cycle Control which determines the sequence of transfers between the registers. Old Number Register 13, Difference Register 19, and Buffer Register 20 are three order of decade registers of conventional design arranged in parallel array. Each decade of these registers will not only store pulses applied thereto, but will also perform a counting function. It will be noted that Difference Register 19 differs from the other two registers in that Carry Circuit 21 is associated therewith to permit carries between the various orders of the register.

Figure 2A:
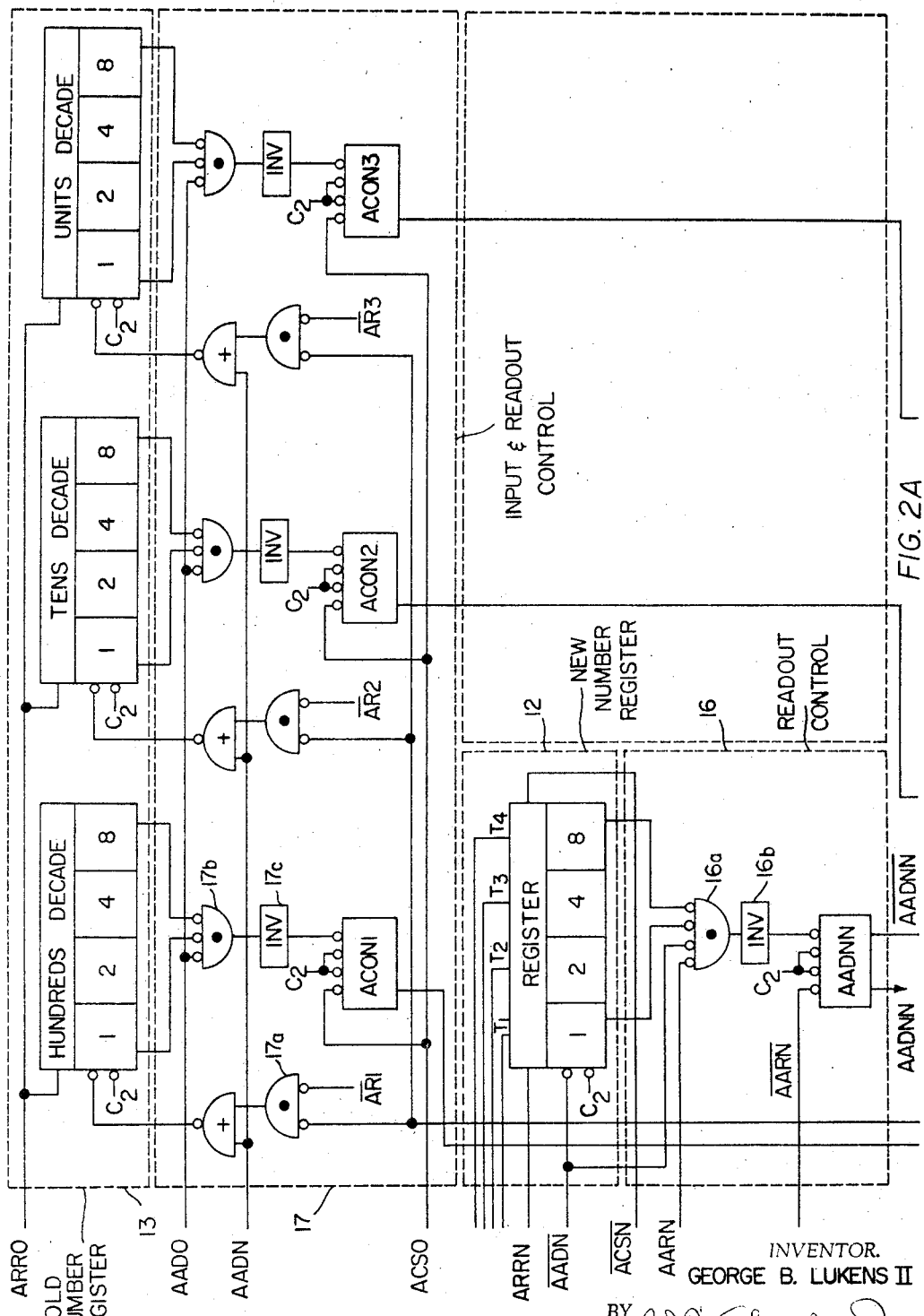

Referring now to FIGS. 2A-2C, the topmost input lead to each order of these registers is the reset input for receiving binary one signals which will reset the register. The second or middle input of each decade constitutes an enabling gate input which will permit each decade to count upwardly when the signal applied thereto is a binary zero. The third input lead to each decade is a clock pulse train input for receiving clock pulses C2 which will cause the counter to count upwardly at the clock pulse rate provided that the enabling gate input is in the binary zero state.

The fourth register, which is a single order register, is New Number Register 12. This register operates in response to the same types of input signals hereinbefore mentioned with respect to the remaining registers. In addition, input terminals T1-T4 are provided to permit the parallel entry of the bits of the digits of the new number as they are generated by Data Source 10. Conventionally, the data source in a numerical control is the tape reader which reads the program information carried by punched tape. In order to permit the parallel entry of these bits, a fourth control is provided and connected to the Read output of the Data Source to time the entry of information into the register with its output of bits of information.

Referring now to FIGS. 2A-2C, means is provided by Readout Control circuits 16, 17, and 22 for permitting the transfer of information from the associated register to another register. As was hereinbefore pointed out, this transfer can be a direct transfer of information or a complementary transfer of information. This transfer of information is provided by flip-flops individually associated with each decade and controlled thereby to provide the enabling gate for the register to which the information is to be transferred. For example, if a count of six is to be added to the contents of a register, it is enabled for a period of time equal to six C2 pulses, thus adding six to its contents. Enabling gates ACON 1, ACON 2, and ACON 3 provide means for enabling Difference Register 19 in response to the contents of Old Number Register 13. In the same manner, enabling gate $\overline{\text{AADNN}}$ provided by Readout Control 16 is applied to Old Number Register 13 through Input Control 17 at the same time as it is applied to Difference Register 19 through Input Control 18.

Readout Control 22 in like manner provides enable gates $\overline{\text{ADA}}$ 1, $\overline{\text{ADA}}$ 2, and $\overline{\text{ADA}}$ 3 to control the addition of the information in Difference Register 19 into Buffer Register 20.

Add/Complement Control 23, which is coupled to receive the overflow from Carry Circuit 21, provides means for sensing the presence of an Overflow from the highest order decade and in response thereto generates an Add One signal which is applied to the lowest order of Difference Register 19 through Input Control 18. Thereafter, Add/Complement Control 23 generates appropriate control signals for adding the number in Difference Register 19 into Buffer Register 20. If, on the other hand, an Overflow signal is not generated by Carry Circuit 21, Readout Control 22 adds the complement of the number in Difference Register 19 into Buffer Register 20 by appropriately controlling the length of time that the decades of the Buffer Register are enabled. Add/Complement Control 23 also registers the appropriate sign in Sign Buffer 24.

Cycle Control 25 generates the appropriate timing signals in the proper sequence to transfer information between the registers.

Next, a detailed description of the manner in which a number contained in one register is added to the contents of another register will be provided. This will be followed by a detailed description of the manner in which the complement of a number in one register is added to the contents of another register.

Figure 6:
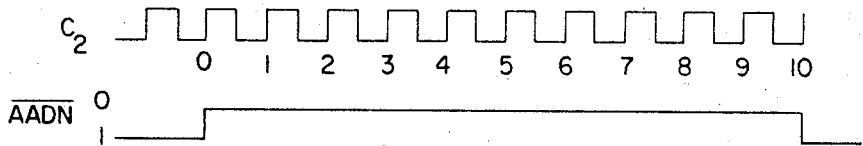
FIG. 6 is a graphic presentation of various timing and control signals and component logic states used in explaining an additive transfer between registers.

The additive transfer of information from one register to another may conveniently be described with respect to the transfer that takes place when the most significant digit of a new number has been registered in New Number Register 12 and it is to be transferred into the Hundreds decade of Old Number Register 13. Reference should be made to FIG. 6 to aid in this discussion. Gate 16a and inverter 16b provide, when enabled by control signals $\overline{\text{AADN}}$ and AARN being in their logic zero state, a binary zero on the set steering input of flip-flop AADNN.

This condition takes place when the register reaches a nine count and thus the circuit which detects this condition is referred to as a nine detector circuit. Upon the application of the next C2 pulse, i.e., when the trigger input goes from binary one to zero, the flip-flop will assume its set condition thus resulting in reset output signal $\overline{AADNN}$ assuming its zero condition. This enabling gate is applied to the enabling gate input of register 13a through gate 17a which is enabled at that time by timing signal $\overline{AR}$ 1 being in its logic zero state. This signal, along with signals $\overline{AR}$ 2 and $\overline{AR}$ 3, is provided by Data Source 10 to route the digits of the new number to the correct order of the registers. Now that register 13a is enabled, and assuming that New Number Register 12 contained a six, it will count in unison with the New Number Register in response to trigger pulses C2 from the fifth to the tenth C2 pulse. At that point, enabling signal $\overline{AADN}$ will assume it logic one state thereby preventing New Number Register 12 and register 13a from counting any further. Register 13a will now contain a count of six in response to the entry of the most significant digit of the new number A complementary transfer will now be described with reference to FIG. 7. It will be assumed that the hundreds order decade of Difference Register 19 is in its reset condition and is thus prepared to receive the complement of the number standing in register 13a. Timing signal $\overline{ACSO}$, in a manner to be hereinafter explained in more detail, goes from logic one to its zero condition at the beginning of the second cycle (see FIG. 4) to apply a steering signal which will permit the flip-flop to be set when the next C2 pulse, i.e., the zero C2 pulse, goes from logic one to zero. As long as flip-flop ACON 1 remains in its set condition, register 19a will count in unison with register 13a. Gate 17b and inverter 17c provide means for sensing the count condition of register 13a and steering the reset input of ACON 1 so that when the Old Number Register reaches a count of nine it will be reset removing enabling gate signal ACON 1 from the enable gate input of register 19a. This will result in register 19a receiving a number of pulses equal to the nine's complement of the number stored in register 13a.

In view of this discussion, it will be obvious how numbers or complements of numbers stored in the other orders of the same registers and transfers between the New Number Register and the Buffer Register are accomplished.

Figure 4:
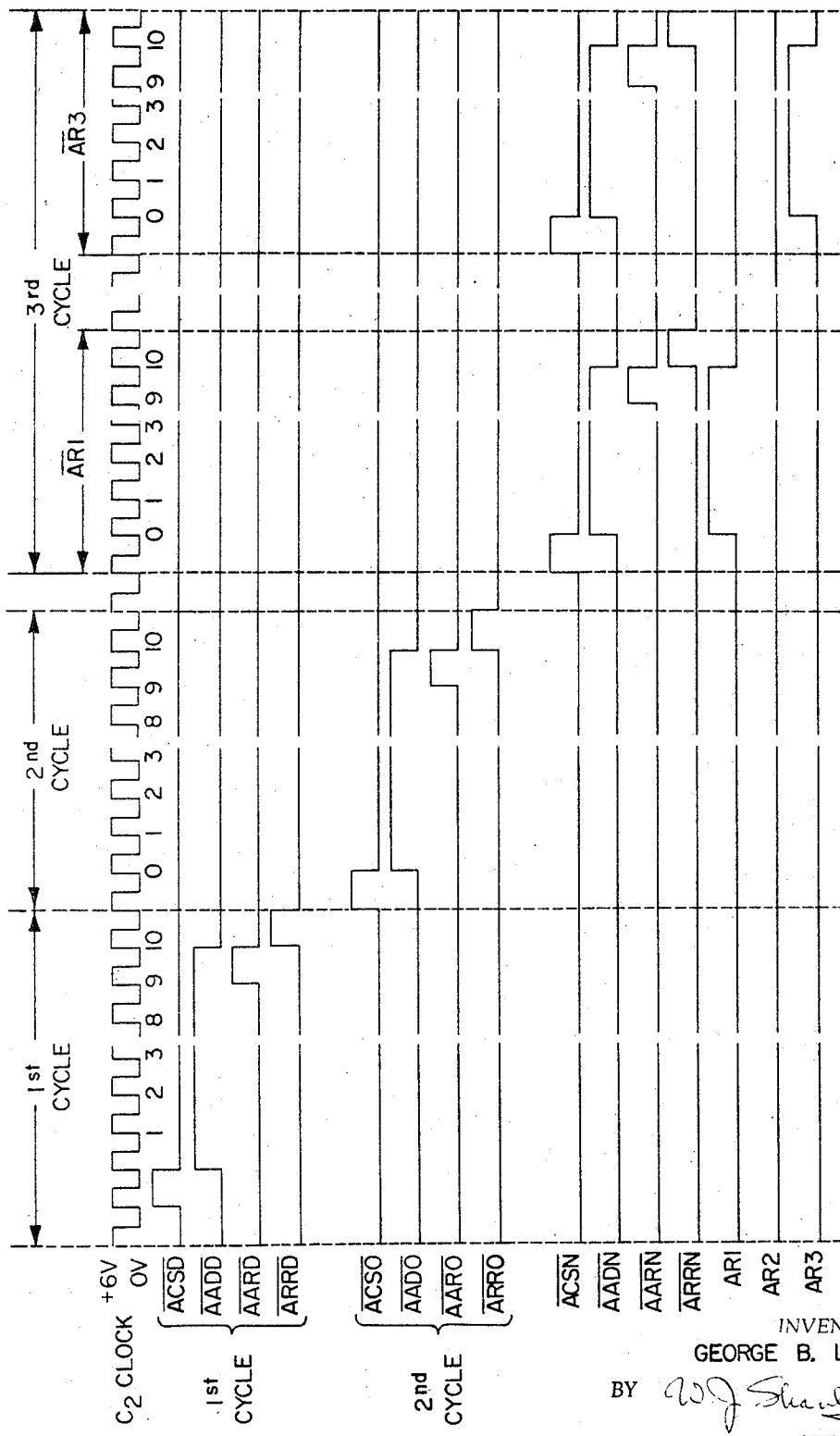
FIG. 4 is a graphic presentation of various timing and control signals and component logic states used in explaining the operation of the circuits of FIGS. 2A-2C.
Figure 7:
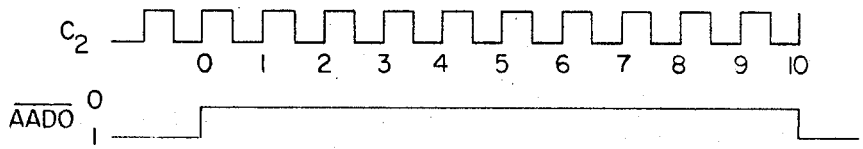
FIG. 7 is a graphic presentation of various timing and control signals and component logic states used in explaining a complementary transfer between registers.

A complete sequence of operation will now be described with reference to the timing chart of FIG. 4 and the chart of FIG. 5.

Figure 3:
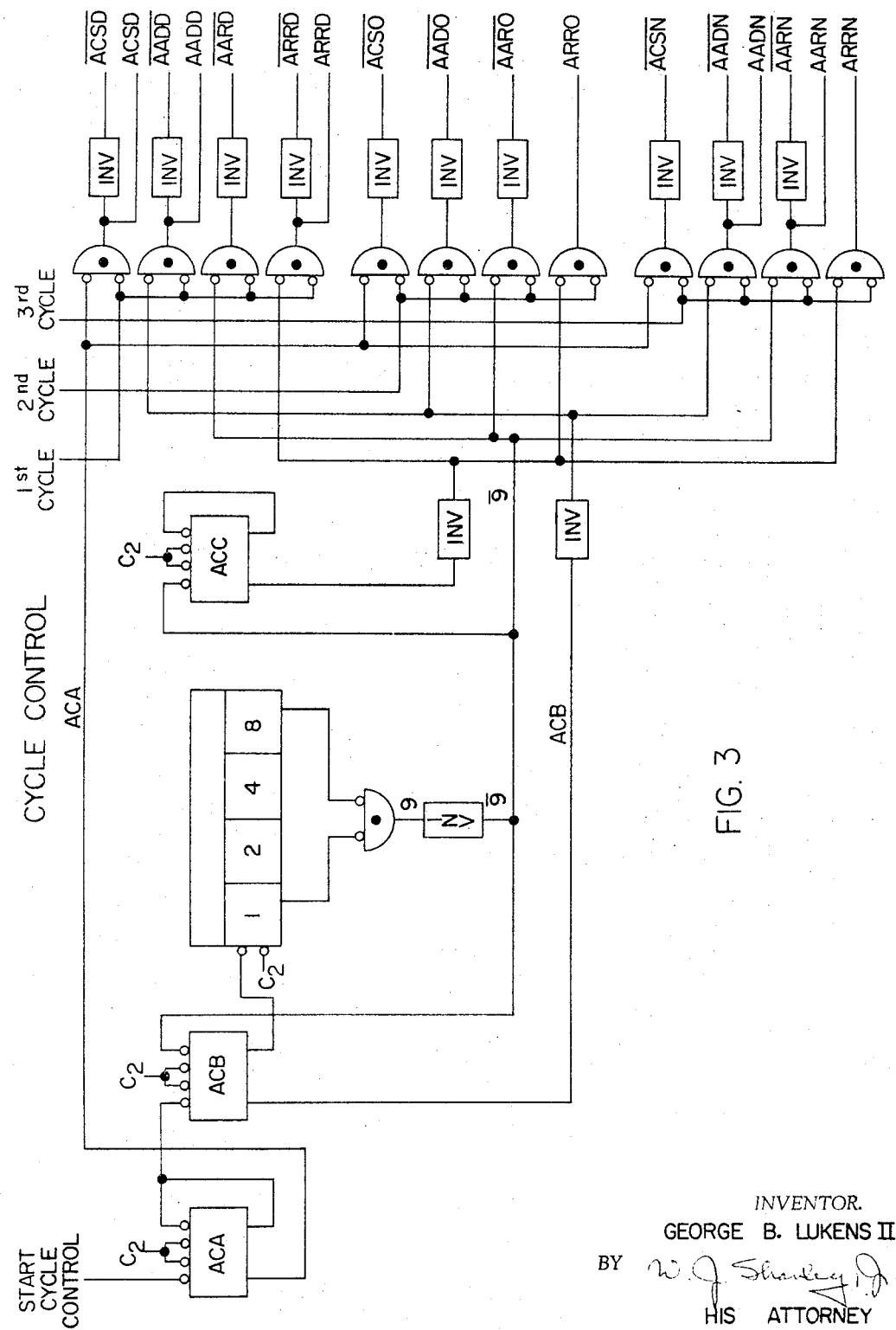
FIG. 3 is a schematic representation of the Cycle Control circuit of the system of FIG. 1.

During the first Cycle Control 25, which is initiated by Start Control Signal of Data Source 10, the uppermost group of gates illustrated in FIG. 3 is enabled to provide the illustrated timing signals to add or complement Difference Register 19 into Buffer Register 20. At the end of this cycle, the difference register is reset by ARRD to prepare it for the second cycle of operation during which time the complement of the number in Old Number Register 13 is transferred to it in parallel under control of the signals generated by the middle group of gates illustrated in FIG. 3. At the end of this cycle, Old Number Register 13 is reset by reset signal ARRO to make way for the next old number which is entered during the third cycle. This cycle, which will hereinafter be referred to as the new number cycle, is divided into subcycles, the number of which is equal to the number of digits present in the new number. During the AR–1 or the first subcycle, which corresponds with the highest order digit, the information is initially entered into the New Number Register 12 and thereafter is read out in an additive manner to simultaneously add this digit to registers 13a and 19a. This sequence repeats again during both the AR–2 and AR–3 subcycles during which times the tens and the units digits are simultaneously added to the appropriate decades of both registers. This will result in Difference Register 19 now containing a number equal to the difference between the old and the new number or the complement of this difference.

Control Signal $\overline{ACAR}$ permits carries between the decades of Difference Register 19 during the times in the third cycle when new numbers are being read into this register. These times will be co-extensive with the time when flip-flop AADNN is in its set condition. In addition, carry control signal $\overline{ACAR}$ also permits carries whenever an Add One signal is generated to thus allow any carries generated by the addition of a pulse to the units decade of Difference Register 19. Gate 21a has two additional control inputs beyond the signals from the nine detector circuit and gate 21b. These inputs are provided to receive signals $\overline{ACAR}$ and ACSD which cooperate to permit an Overflow during the new number addition cycle but to inhibit such a condition occurring in response to the Add One cycle.

Referring now to FIG. 2C, Add/Complement Control 23 will be described so as to afford a complete understanding of the manner in which it controls the transfer of digits during the first cycle from the difference register to the buffer register. Assuming that the new number is larger than the old number, the Overflow signal appears at the output of inverter 21c and is applied to the set steering input of flip-flop ADAD so as to set this flip-flop in response to the next C2 pulse. This will result in reset output signal $\overline{ADAD}$ assuming its logic zero condition by the end of the third or new number cycle. Thus gate 23a will be enabled at the beginning of the next first cycle so that it will be operated to generate the Add One signal in response to signal $\overline{ACSD}$ assuming its logic zero condition (see FIG. 4). Control signal $\overline{AADB}$, which is applied to one input of gates 22a, 22d, and 22e, will assume its zero condition during the enable gate period when signal $\overline{AADD}$ is logic zero so as to permit these gates to respond to the sensing of a nine condition in the associated register as evidenced by the presence of signal $\overline{9}$. Operation of these gates will set the corresponding ADA flip-flop so that it permits the associated order of Buffer Register 20 to count C2 pulses in unison with the corresponding order of Difference Register 19a. Upon termination of $\overline{AADD}$, each order of register 20 will have received a number of pulses equal to the number stored in the corresponding order of register 19. The ADA flip-flops are then reset by AADC which is generated in response to reset signal $\overline{AARD}$.

Assuming now that the new number is smaller than the old number, flip-flop ADAD will remain reset due to the absence of the Overflow signal. Thus when signal ACSD is generated at the beginning of the first cycle, gates 23b and 23c will operate to generate $\overline{ADCP}$ and $\overline{ADCPS}$. $\overline{ADCPS}$ will operate gate 22b since the other input of this gate will be in the logic zero state as long as register 19a is not in its nine condition. This will result in permitting register 20a to count in unison with register 19a until gate 22c is operated in response to the sensing of a count of eight in register 19a. This permits the resetting of ADA 1 upon receipt of the next C2 pulse. Thus flip-flop ADA 1 will be reset when register 19a registers nine. Thus register 20a will be inhibited from counting the balance of period AADD thus resulting in its containing the complement of the count in Difference Register 19a.

Carry signal $\overline{ACAR}$ is also applied to the set steering of Sign Flip-flop 24a to place this flip-flop in its set condition to indicate a positive sign. Later when flip-flop ADAD is reset by $\overline{ARRD}$, signal $\overline{ADCPS}$ will assume its zero condition, thus permitting Sign Flip-flop 24a to be reset by the next C2 pulse.

To summarize then, it will be readily apparent that in accordance with my invention I have provided a binary subtracter of the counting type which is capable of successively obtaining the difference between consecutive random-magnitude numbers successively presented and then made available as a number having a sign which indicates which number was the larger.

While the principles of the invention have now been described with respect to an illustrative embodiment, it will be obvious to those skilled in the art that many modifications in structure, arrangement, and components may be made without departing from the spirit or scope of the invention. The appended claims are, therefore, intended to cover and embrace any such modifications, within the limits only of the true spirit and scope of the invention.

What I claim as new and desire to secure by Letters Patent of the United States is:

1. A system for obtaining the difference between a first plural-order number and a second plural-order number comprising first and second groups of registers operative in a decimal radix system and each comprising an array of a plurality of pulse registers ordered in said array in accordance with digit significance, said first group of registers containing said first number stored therein;
  means coupled to said first group of registers for applying to each register therein a number of pulses at least as great as the largest digit stored in any of said registers but not greater than said radix;
  individual means coupled to each register of said first group and responsive to the count condition of its associated register for applying to the registers of said second group a number of pulses equal to the nine's complement of the number stored in the corresponding register of said first group of register; and
  means for applying to each register of said second group a number of pulses equal to the magnitude of the corresponding digits of said second number.

2. The combination of claim 1 further comprising carry means coupled to said second group of registers for permitting when enabled the propagation of carry signals between a lower order register and a higher order register, and means for enabling said means duing the times the pulses responsive to said second number are being applied to said second group of registers.

3. The combination of claim 2 further comprising means to sense an overflow carry from the highest order register of said second group to indicate which number is larger.

4. The combination of claim 3 further comprising means responsive to said sensing means detecting an overflow carry for adding one pulse to the lowest order register of said second group, said radix system being a binary-coded decimal system said pulse adding means being coupled to said carry means to enable said carry means during the period when a pulse is being added to said lowest order register.

5. The combination of claim 4 further comprising a third plural-order register and individual means coupled to each register of said second group and responsive to the count condition of the associated registers of said second group and in response to said sensing means detecting an overflow carry for applying to the registers of said third group a number of pulses equal to the number stored in the corresponding register of said second group.

6. The combination of claim 5 in which said third register pulse applying means is responsive to the failure of said sensing means to detect an overflow carry condition for individually applying to the registers of said third group a number of pulses equal to the nine's complement of the number stored in the corresponding registers of said second group of registers.

7. The combination of claim 6 further comprising means coupled to said carry means for inhibiting an overflow carry from the highest order register of said second group in response to the addition of said one pulse to said lowest order register.

8. The combination of claim 2 in which said means for applying said second plural-order number comprises a single order register which is sequentially coupled order-by-order starting with the highest order register, with the registers of said second group in timed relationship with the application of the digits of said second number to said single order register.

9. The combination of claim 8 in which the registers of said first group are reset following the complementary transfer of the numbers from said first group to said second group of registers, said single order register also being sequentially coupled order-by-order starting with the highest order register with the registers of said first group simultaneously with its association with the register of said second group to thereby store a number in said first group of registers for later use during the next cycle of operation.

10. A system for obtaining the difference between an old plural-order number and a new plural-order number comprising first, second and third groups of registers operative in a given radix system and each comprising an array of a plurality of pulse registers ordered in said array in accordance with digit significance,
  means for storing said old number in said third group of registers,
  means for storing said new number in said first group of registers,
  means coupled to said first group of registers for applying to each register therein a number of pulses at least as great as the largest digit stored in any of said registers but not greater than said radix,
  individual means coupled to each register of said third group of registers and responsive to the count condition of its associated registers for applying to the registers of said second group of registers of said second group of registers a number of pulses equal to the complement of the number stored in the corresponding registers of said third group of registers,
  means for clearing said third registers,
  individual means coupled to each register of said first group of registers and responsive to the count condition of its associated registers for applying to the registers of said second and third groups of registers a number of pulses equal to the number stored in the corresponding registers of said first group of registers,
  said second group of registers responsive to said applied pulses for adding said applied pulses to obtain added signals.

11. An arrangement according to claim 10 further comprising said second group of registers responsive to said applied pulses for generating any carry signals,
  and means for complementing or not complementing said signals in accordance with the generation of any carry signals.

12. A system for obtaining the difference between a first plural order number and a second plural order number comprising first, second and third registers,
  means for storing said first number as a count condition in said third register,
  means for storing said second number as a count condition in said first register,
  means coupled to said third register and responsive to its count condition for applying to the second register a number of pulses equal to the complement of the number stored in said third register,
  means for clearing said third register,
  means coupled to said first register and responsive to its count condition for applying a number of pulses equal to the number stored in said first register to said second and third registers, and means including said second register and carry circuit means responsive to pulses applied to said second register for adding said last named applied pulses to obtain added signals and carry signals, and means for complementing or not complementing said added signals in accordance with the generation of any carry signals.

References Cited

UNITED STATES PATENTS

| | | | |
|---|---|---|---|
| 2,974,863 | 3/1961 | Williams et al. | 235—151.33 |
| 3,185,822 | 5/1965 | Davis | 235—175 XR |
| 3,250,899 | 5/1966 | Smith | 235—152 |
| 3,257,549 | 6/1966 | Mahro et al. | 235—177 XR |
| 3,278,733 | 10/1966 | Kowalski | 235—177 XR |
| 3,290,494 | 12/1966 | Schneberger et al. | 235—175 |

MARTIN P. HARTMAN, *Primary Examiner.*

U.S. Cl. X.R.

235—175, 160